(12) United States Patent
Anderson et al.

(10) Patent No.: US 10,279,641 B2
(45) Date of Patent: May 7, 2019

(54) DISTRIBUTED ACTIVE SUSPENSION WITH AN ELECTRICALLY DRIVEN PUMP AND VALVE CONTROLLED HYDRAULIC PUMP BYPASS FLOW PATH

(71) Applicant: ClearMotion, Inc., Woburn, MA (US)

(72) Inventors: Zackary Martin Anderson, Cambridge, MA (US); Zachary J. Jackowski, Somerville, MA (US); Ryan Bavetta, Aptos, CA (US)

(73) Assignee: ClearMotion, Inc., Billerica, MA (US)

( * ) Notice: Subject to any disclaimer, the term of this patent is extended or adjusted under 35 U.S.C. 154(b) by 0 days.

(21) Appl. No.: 16/122,744

(22) Filed: Sep. 5, 2018

(65) Prior Publication Data

US 2019/0001775 A1 Jan. 3, 2019

Related U.S. Application Data

(63) Continuation of application No. 16/018,581, filed on Jun. 26, 2018, which is a continuation of application
(Continued)

(51) Int. Cl.
*B60G 13/14* (2006.01)
*B60G 17/08* (2006.01)

(52) U.S. Cl.
CPC .............. *B60G 13/14* (2013.01); *B60G 17/08* (2013.01); *B60G 2202/416* (2013.01); *B60G 2202/42* (2013.01); *B60G 2204/62* (2013.01); *B60G 2400/202* (2013.01); *B60G 2500/104* (2013.01); *B60G 2500/11* (2013.01)

(58) Field of Classification Search
CPC ..... B60K 25/10; B60K 2025/103; F16F 9/18; H02K 7/1876; F03G 3/00; B60G 13/14; B60G 2300/60

See application file for complete search history.

(56) References Cited

U.S. PATENT DOCUMENTS

| 4,295,538 A | 10/1981 | Lewus |
| 5,028,073 A | 7/1991 | Harms et al. |

(Continued)

FOREIGN PATENT DOCUMENTS

| CN | 2707546 Y | 7/2005 |
| DE | 39 37 987 A1 | 5/1991 |

(Continued)

OTHER PUBLICATIONS

International Search Report and Written Opinion dated Oct. 28, 2010 in connection with International Application No. PCT/US2010/002116.

*Primary Examiner* — Vishal R Sahni (74) *Attorney, Agent, or Firm* — Wolf, Greenfield & Sacks, P.C.

(57) ABSTRACT

A regenerative shock absorber that include a housing and a piston that moves at least partially through the housing when the shock is compressed or extended from a rest position. When the piston moves, hydraulic fluid is pressurized and drives a hydraulic motor. The hydraulic motor, in turn, drives an electric generator that produced electric energy. The electric energy may be provided to a vehicle, among other things. The regenerative shock absorber may also provide ride performance that comparable to or exceeds that of conventional shock absorbers.

30 Claims, 9 Drawing Sheets

Related U.S. Application Data

No. 15/432,889, filed on Feb. 14, 2017, now Pat. No. 10,035,397, which is a continuation of application No. 14/989,725, filed on Jan. 6, 2016, now Pat. No. 9,597,939, which is a continuation of application No. 14/458,711, filed on Aug. 13, 2014, now Pat. No. 9,260,011, which is a continuation of application No. 12/534,629, filed on Aug. 3, 2009, now Pat. No. 8,839,920, which is a continuation-in-part of application No. 12/104,800, filed on Apr. 17, 2008, now Pat. No. 8,376,100.

(56) References Cited

U.S. PATENT DOCUMENTS

| | | | |
|---|---|---|---|
| 5,329,767 A | | 7/1994 | Hewett |
| 5,682,980 A | * | 11/1997 | Reybrouck ............ B60G 17/04 |
| | | | 280/124.16 |
| 6,519,939 B1 | | 2/2003 | Duff |
| 7,051,526 B2 | | 5/2006 | Geiger |
| 7,631,736 B2 | | 12/2009 | Thies et al. |
| 8,776,961 B2 | | 7/2014 | Mori et al. |
| 9,108,484 B2 | | 8/2015 | Reybrouck |
| 10,035,397 B2 | * | 7/2018 | Anderson ............. B60G 13/14 |
| 2003/0077183 A1 | | 4/2003 | Franchet et al. |
| 2007/0089924 A1 | * | 4/2007 | de la Torre ........... B60G 13/14 |
| | | | 180/305 |
| 2007/0233279 A1 | | 10/2007 | Kazerooni et al. |
| 2008/0190104 A1 | | 8/2008 | Bresie |
| 2008/0257626 A1 | * | 10/2008 | Carabelli ............. B60G 13/14 |
| | | | 180/165 |
| 2009/0260935 A1 | | 10/2009 | Avadhany et al. |

FOREIGN PATENT DOCUMENTS

| | | |
|---|---|---|
| DE | 199 20 109 A1 | 11/2000 |
| DE | 103 20 053 A1 | 11/2004 |
| DE | 10 2004 056610 A1 | 6/2006 |
| DE | 10 2010 023434 A1 | 12/2011 |
| EP | 1 878 598 A1 | 1/2008 |
| FR | 2661643 A1 | 11/1991 |
| JP | H01-131343 A | 5/1989 |
| JP | H01-131345 A | 5/1989 |
| JP | 2000-264033 A | 9/2000 |
| JP | 2000-264034 A | 9/2000 |
| JP | 2007-298063 A | 11/2007 |
| WO | WO 2010/066416 A1 | 6/2010 |

\* cited by examiner

DISTRIBUTED ACTIVE SUSPENSION WITH AN ELECTRICALLY DRIVEN PUMP AND VALVE CONTROLLED HYDRAULIC PUMP BYPASS FLOW PATH

RELATED APPLICATIONS

This Application is a continuation of U.S. application Ser. No. 16/018,581, filed Jun. 26, 2018, which is a continuation of U.S. application Ser. No. 15/432,889, filed Feb. 14, 2017, which is a continuation of U.S. application Ser. No. 14/989,725, filed on Jan. 6, 2016, which is a continuation of U.S. application Ser. No. 14/458,711, filed on Aug. 13, 2014, which is a continuation of U.S. application Ser. No. 12/534,629, filed on Aug. 3, 2009, which is a continuation in part of U.S. application Ser. No. 12/104,800, filed on Apr. 17, 2008, each of which is herein incorporated by reference in their entirety.

BACKGROUND

A typical automobile suspension system includes a shock absorber that dissipates energy associated with suspension motion. Shock absorbers typically include a shock housing with a piston positioned inside that is movable in both a compression stroke and an extension stroke. An orifice is positioned in the piston. The motion of the piston causes a high viscosity fluid to pass through the orifice as the piston moves in order to dampen suspension motion.

The applicants have appreciated that conventional shock absorbers, when providing dampening, waste a significant amount of energy as heat. This energy, if captured, could prove useful in providing energy for a vehicle.

SUMMARY

Aspects of the invention relate to a regenerative shock absorber that captures energy associated with relative motion in the shock, while also providing ride performance that is comparable to or that exceeds that of conventional shock absorbers.

According to one aspect, a regenerative shock absorber comprises a housing that includes a compression volume and an extension volume. A piston is disposed in the housing. In a first mode, the piston moves through at least a portion of a compression stroke to pressurize hydraulic fluid in the compression volume. In a second mode, the piston moves at least partially through an extension stroke to pressurize hydraulic fluid in the extension volume. A hydraulic motor includes a first port and a second port. The first port is in fluid communication with the compression volume and the second port is in fluid communication with the extension volume. The hydraulic motor always moves in sync with the piston. A reservoir has a reservoir volume. One or more valves, in the first mode, provide fluid communication between the second port of the hydraulic motor and the reservoir. In the second mode, the one or more valves provide fluid communication between the first port of the hydraulic motor and the reservoir.

According to another aspect, a regenerative shock absorber comprises a housing that includes a compression volume and an extension volume. A piston is disposed in the housing. In a first mode, the piston moves through at least a portion of a compression stroke to move hydraulic fluid from the compression volume. In a second mode, the piston moves at least partially through an extension stroke to move hydraulic fluid from the extension volume. A hydraulic motor includes a first port and a second port. The first port is in fluid communication with the compression volume and the second port is in fluid communication with the extension volume. One or more valves, when in a bypass mode, provide fluid communication between the compression volume and the extension volume to bypass the hydraulic motor, allowing the piston to move without providing substantial damping.

According to another aspect, a regenerative shock absorber comprises a housing that includes a compression volume and an extension volume. A piston is disposed in the housing. In a first mode the piston moves through at least a portion of a compression stroke to pressurize hydraulic fluid in the compression volume. In a second mode the piston moves at least partially through an extension stroke to pressurize hydraulic fluid in the extension volume. One or more valves, when in the first mode, provide a fluid path to the inlet of the hydraulic motor for hydraulic fluid that is moved from the compression volume and for hydraulic fluid to move toward the extension volume from the outlet of the hydraulic motor. In a second mode, the one or more valves provide a fluid path to the inlet of the hydraulic motor for hydraulic fluid that is moved from the extension volume and for hydraulic fluid to move toward the compression volume from the outlet of the hydraulic motor. The one or more valves are configured to allow the hydraulic motor to move out of sync with the piston. A reservoir has a reservoir volume and is in fluid communication with the outlet of the hydraulic motor. One or more of the regenerative shock absorbers are assembled into a suspension system of a vehicle. Damping of the suspension system is provided primarily by the one or more regenerative shock absorbers.

According to another aspect, a regenerative shock absorber includes a shock housing that has a compression volume and an extension volume. A piston is disposed in the shock housing. In a first mode the piston moves through at least a portion of a compression stroke to pressurize hydraulic fluid in the compression volume. In a second mode the piston moves at least partially through an extension stroke to pressurize hydraulic fluid in the extension volume. The regenerative shock absorber also includes a motor/generator housing. A hydraulic motor is incorporated into the motor/generator housing and includes a first port, a second port and an output. The first port is in fluid communication with the compression volume and the second port is in fluid communication with the extension volume. An electric generator is at least partially internal to the motor/generator housing. The electrical generator coupled to the output in a manner that lacks seals associated with sliding friction. Hydraulic controls may be included to control fluid communication between ports of the hydraulic motor and the compression and extension volumes of the shock housing.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Aspects of the system relate to a regenerative shock absorber. Embodiments of the shock absorber may include a housing and a piston that moves at least partially through a compression stroke when the shock is compressed. The piston may additionally move at least partially through an extension stroke when the shock is extended (i.e., the piston may be double-acting). When the piston moves, hydraulic fluid is pressurized and moved to drive a hydraulic motor. The hydraulic motor, in turn, drives an electric generator that produces electric energy that may be provided to a vehicle.

According to one aspect, movement of the piston through the housing may always be associated with corresponding movement of the hydraulic motor. That is, fluid connections between the shock absorber and the hydraulic motor may be configured such that pressure of hydraulic fluid that is associated with movement of the piston through the compression volume always urges the hydraulic motor to move in a first direction. Similarly, pressure of the hydraulic fluid associated with movement of the piston through the extension volume may always urge the hydraulic motor to move in a second direction, opposite to the first direction. In this respect, the piston and hydraulic motor may always move in sync with one other (equivalently described herein as being in phase or lockstep). Freewheeling of the hydraulic motor, as occurs in some embodiments of regenerative shock absorber systems, is prevented. "Freewheeling", as that term is used herein, refers to rotation of a motor at a rate that drives more fluid than the fluid being displaced by piston movement. Freewheeling may occur if the damping force on the electric generator is less than the force presented from the rotational deceleration of a mass of the hydraulic motor.

According to another aspect, fluid connections between the housing of the shock absorber and the hydraulic motor may be made with few or no valves. Reducing or eliminating the number of valves, such as spool valves or check valves, between the shock absorber and hydraulic motor may reduce energy losses normally associated with the movement of hydraulic fluid through such valves (i.e., "valve-free"). This aspect may improve the energy efficiency of the regenerative shock absorber system.

According to another aspect, the system may include a reservoir that is sized to accommodate a change in the volume of the hydraulic system associated with movement of a piston rod into and out of the shock absorber housing. The reservoir may be positioned on an outlet (i.e., low pressure side) of the hydraulic motor. Embodiments of the regenerative shock system with hydraulic motors that operate in different directions may include one or more valves that operate to keep the reservoir positioned at the outlet of the hydraulic motor, since the fluid may move out of the hydraulic motor in different directions depending on the mode of operation.

Yet another aspect of the system may allow the hydraulic motor to be used as a hydraulic pump to apply a force to the piston. This may be accomplished by driving the electric generator as an electric motor. The electric motor, in turn, may drive the hydraulic motor as a hydraulic pump, although a separate hydraulic pump could alternatively be used.

Additional aspects relate to changing damping of the electric generator to dynamically control a response of the shock absorber. A control may be used to control the direction and/or magnitude of force on the piston of the shock absorber to desired levels. By way of example, according to one embodiment a response can be controlled to mimic the force/velocity response (i.e., damping) of a conventional automotive shock absorber. According to other embodiments, the controller may alter the force/velocity response due to changes in driving conditions.

According to additional aspects, the hydraulic motor, when used as a hydraulic pump, may allow the position of the piston in the shock absorber to be controlled. Controlling the position of the piston in a vehicle suspension system may, in turn, allow the height of a vehicle to be controlled. According to some embodiments, locks may additionally be incorporated into the system to hold the shocks and/or a vehicle at a desired height.

Additional aspects relate to determining whether the piston of a shock absorber is moving in a compression stroke or an extension stroke without the use of sensors. According to some embodiments, a voltage generated at the generator will change in polarity in response to a change in the direction of motion of the piston. In this respect, a controller may determine the direction of piston travel by identifying the polarity of electric generator output. According to some embodiments, such as automotive applications, the controller may employ information associated with the direction of piston motion to, in turn, control the damping rate for each direction.

Additional aspects relate to determining velocity of the piston in the shock absorber without the use of sensors. According to some embodiments, a voltage generated by the electric generator may change proportionally (linearly or otherwise) with respect to piston velocity. A controller may determine velocity of the piston travel by measuring the voltage of the electric generator output, along with information on the relationship between piston velocity and generator voltage.

According to yet another aspect, a regenerative shock absorber may be configured to provide damping when moved in only one of a compression or extension stroke. Valve(s) may be incorporated into the system that bypass the hydraulic motor when the system is moved in the opposite direction.

Other aspects relate to regenerative shock absorbers being assembled into the suspension system of a vehicle. The regenerative shock absorbers may provide a primary source of damping in the suspension system. Alternatively, however, the shock absorbers may be installed in parallel with conventional shock absorbers.

Other aspects relate to integrating the hydraulic motor and electric generator together to substantially reduce or eliminate frictional losses. The motor and generator may be at least partially integrated into a common motor/generator housing, which may eliminate the need to provide frictional shaft seal(s) on a shaft of the hydraulic motor.

Other aspects relate to a controller that sets an impedance on the electric generator to control a force/velocity response of the regenerative shock absorber.

Other aspects relate to a regenerative shock system having fluidic connections between the housing and the hydraulic motor that may be configured to allow the hydraulic motor to freewheel, at times. Freewheeling may reduce the apparent shock absorber inertia associated with a change in piston direction, as compared to systems in which freewheeling is prevented.

Figure 1:
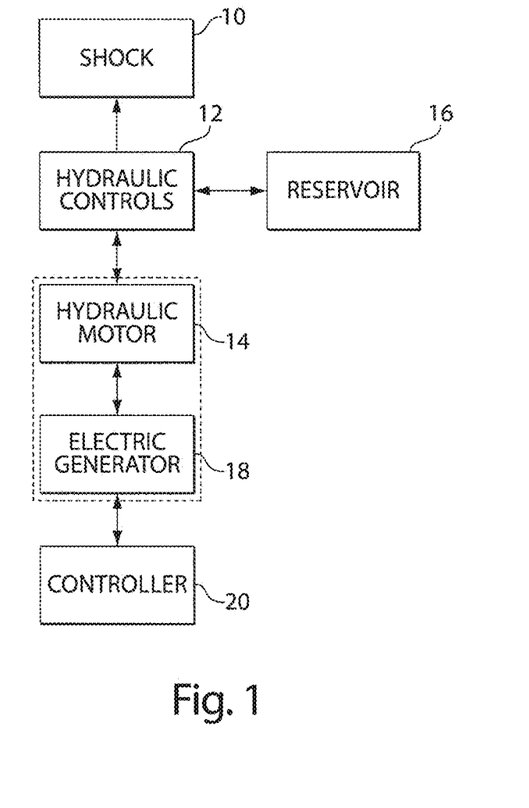
FIG. 1 is a functional block diagram of a regenerative shock absorber system, according to one embodiment.

Turning now to the figures, and initially FIG. 1, which shows a functional block diagram of a regenerative shock absorber system. The system includes a shock 10 that, when compressed or extended, pressurizes and moves hydraulic fluid to drive a hydraulic motor 14. The hydraulic motor 14, in turn, drives an electric generator 18 to produce electric energy. Hydraulic controls 12 may control how and when the hydraulic fluid is passed to hydraulic motor 14. Additionally or alternatively, hydraulic controls may ensure that fluid communication is maintained between reservoir 16 and an outlet of the hydraulic motor. The system may incorporate a controller 20 that controls a force/velocity relationship (i.e., damping) of the shock absorber, or other measured relationships such as force/frequency, to a desired constant value or to varying values.

Figure 2:
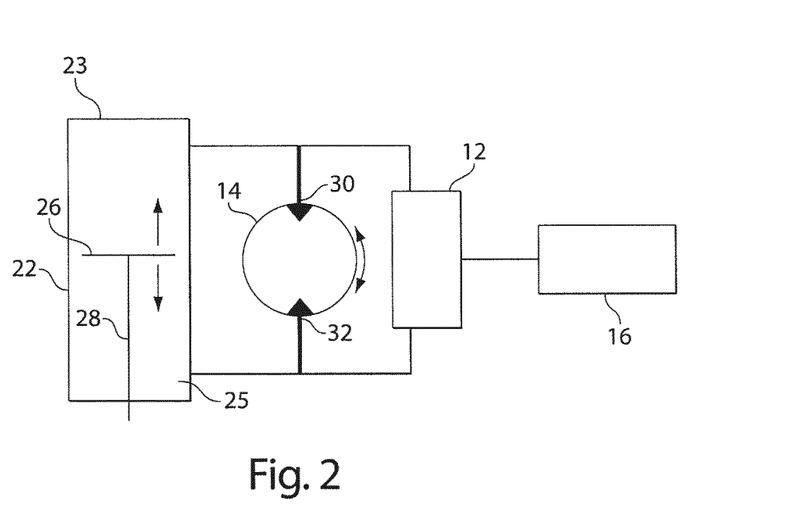
FIG. 2 is a hydraulic schematic of one embodiment of a regenerative shock absorber system.

As shown in FIG. 2, various embodiments may include a shock absorber 10 that has a housing 22 and a piston that moves in a compression stroke through at least a portion of a compression volume 23 of the housing 22 when the shock is compressed from a rest position. The piston 26 may additionally move in an extension stroke through an extension volume 25 of the housing 22 when the shock is extended from the rest position (i.e., the piston may be double-acting). It is to be appreciated that the piston 26 may only move partially through the compression volume 23 and/or extension volume 25 during typical operation. When the piston 26 does move, hydraulic fluid is pressurized in either the compression volume or the extension volume. The pressurized hydraulic fluid moves from the housing 22 to drive the hydraulic motor 14. The hydraulic motor 14, in turn, drives an electric generator 28 that produces electric energy.

In the embodiment of FIG. 2, the compression volume 23 and the extension volume 25 are in direct fluid communication with first 30 and second ports 32, respectively, of the hydraulic motor 14. That is, the fluid connections between the compression 23 and extension volumes 25 and ports 30, 32 of the hydraulic motor 14 lack valves that provide a restriction to flow, such as check valves and the like (i.e., they are "valve-free"). Valves are often configured in a manner that restricts the flow of fluid therethrough, even when fully open. Elimination of valves, in this respect, may eliminate restriction points that might otherwise cause energy losses in the system, particularly between the shock housing 10 and hydraulic motor 14, where flow rates may be the greatest. It is to be appreciated, however, that other embodiments may include one or more valves between the compression and/or extension volumes and the hydraulic motor.

The hydraulic controls 12 in the embodiment of FIG. 2 run in parallel to the hydraulic motor 14 such that flow through the hydraulic controls 12 may be separate from flow through the hydraulic motor 14. The hydraulic controls 12 in the embodiment of FIG. 2, include a valve that selectively controls fluid communication between a reservoir 16 and the first and second ports of the hydraulic motor. Valve(s) in the hydraulic controls may be configured to sense pressure at the first 30 and second ports 32 of the hydraulic motor 14, and to maintain fluid communication between the low pressure side, or outlet side, of the hydraulic motor and the reservoir 16. By way of example, when pressure is higher at the first port 30, such as during a compression stroke, the valve(s) 12 may open fluid communication between the second port 32 and the reservoir 16 while closing fluid communication between the first port 30 and reservoir 16. Conversely, when pressure is higher at the second port 32, fluid communication may be opened between the first port 30 and reservoir 16, and closed between the second port 32 and reservoir 16. In this respect, flow through the valve(s) 12 may be minimized to, in turn, minimize losses in the system since flow to and from the reservoir 16 is substantially less than flow through the hydraulic motor 14.

Figure 3A:
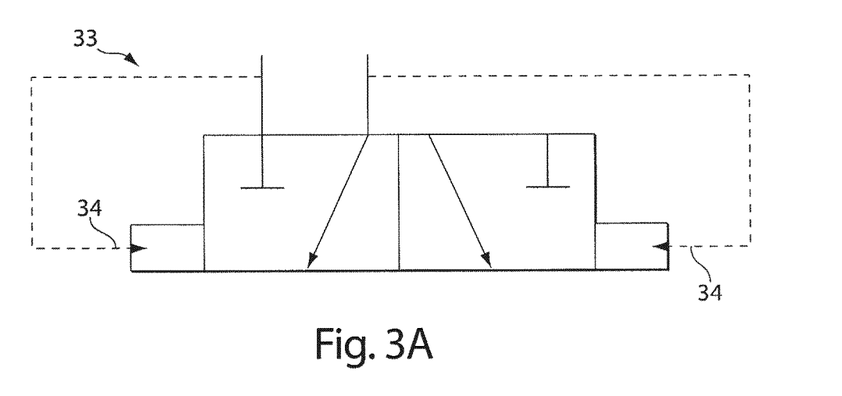
FIGS. 3A and 3B are hydraulic schematic diagrams of valves that may be used to control hydraulic flow in the embodiment of FIG. 2.
Figure 3B:
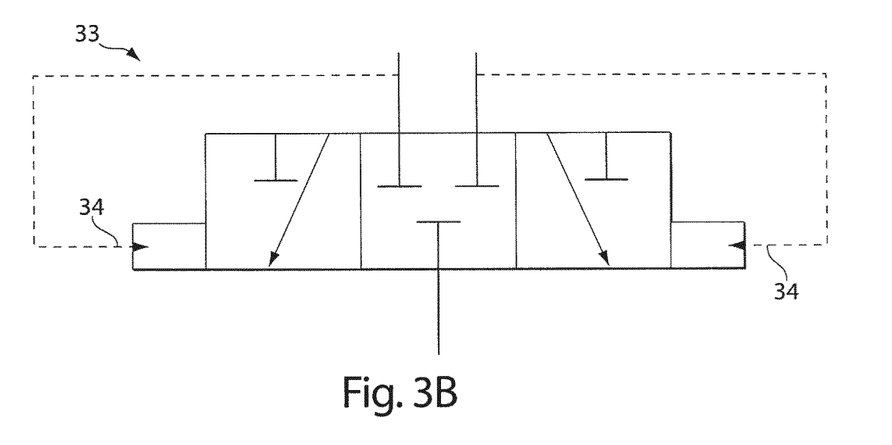
Figure 3C:
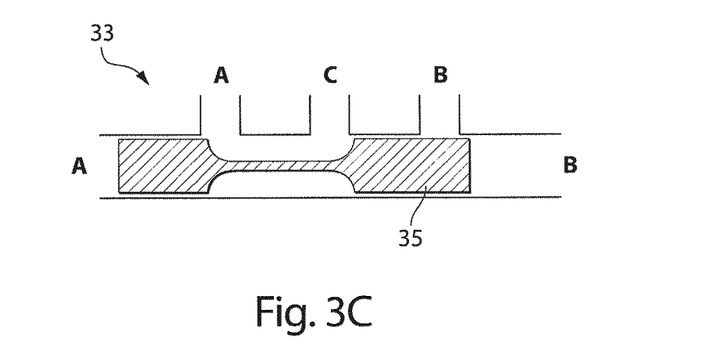
FIG. 3C is a cross-sectional view of the valve represented by the schematic of FIG. 3B.

The hydraulic controls 12 in the embodiment of FIG. 2 may include various valve arrangements. Some examples include spool valves 33 as represented schematically in FIGS. 3A and 3B, which are pilot operated hydraulic spool valves. The spool valve shown in FIG. 3B may be acquired from Parker Hannifin Corporation. Pilot connections 34 of the spool valves react to a pressure differential across the first 30 and second ports 32 of the hydraulic motor 14, and move the spool 35 of the valve 33 accordingly to direct hydraulic flow, as discussed above. The spool of FIG. 3A is a two position valve that either places the reservoir 16 in fluid communication with the hydraulic motor at only one of the first port 30 or the second port 32. The spool of FIG. 3B includes a third position where fluid communication with the reservoir is closed altogether. FIG. 3C is a cross-sectional view of one embodiment of a valve represented by the schematic of FIG. 3B. It is to be appreciated that FIGS. 3A-3C merely show a few embodiments of valve(s) that may be used to control fluid communication to a reservoir 16 in a system like that of FIG. 2, and that other arrangements are also possible.

Figure 4A:
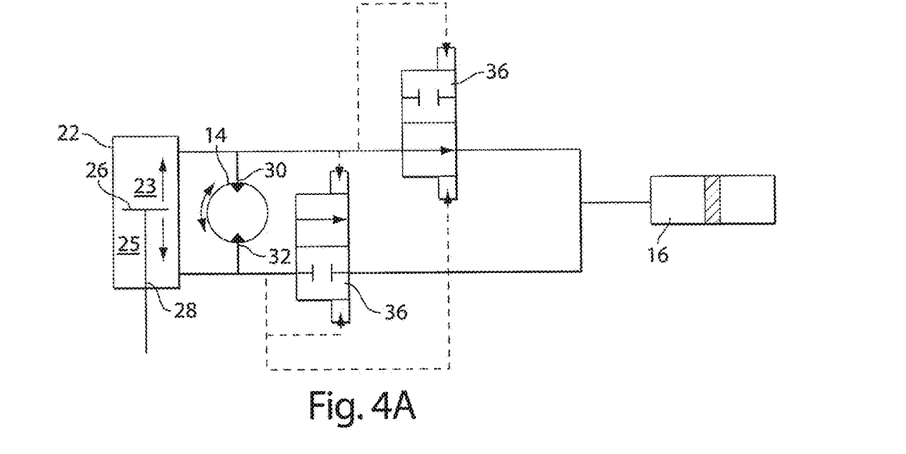
FIGS. 4A and 4B show hydraulic schematics for alternative hydraulic controls that may be used in the embodiment of FIG. 2.
Figure 4B:
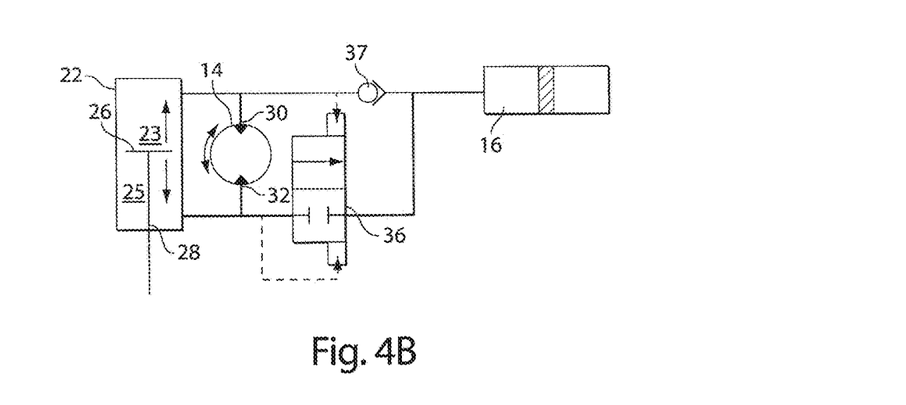

FIGS. 4A and 4B show alternative embodiments of hydraulic controls 12 that may be implemented into the system of FIG. 2 to control fluid communication to the reservoir 16. In the embodiment of FIG. 4A, a first pilot operated valve 36 is positioned between the first port 30 of the hydraulic motor 14 and the reservoir 16. Additionally, a second pilot operated valve 36 is positioned between the second port 32 of the hydraulic motor and the reservoir 16. Each of the valves 36, in this embodiment, individually closes or opens fluid communication between the reservoir 16 and the corresponding port of the hydraulic motor 14, depending on the direction of motion of the piston 26. In the embodiment of FIG. 4B, one of the pilot operated valves 36 is replaced with a check valve 37. Although FIGS. 4A and 4B show two different embodiments of valve(s) that may be used to control fluid communication to the reservoir, it is to be appreciated that others may also exist.

The reservoir 16 may be sized to accommodate changes in the volume of the hydraulic system that are associated with movement of the piston rod 28 into and/or out of the housing 32. The piston rod 28, when moved into the housing 22 of the shock absorber 10, occupies a volume of space internal to the housing 22 that was previously available for hydraulic fluid. The reduction in volume associated with the introduction of the piston rod 22 into the hydraulic system is accommodated by the reservoir 16, which may increase in volume by at least the same volume occupied by the piston rod 28 when fully compressed. It is to be appreciated that the volume occupied by the piston rod 28 in the housing 28 is equivalent to the difference in the maximum volume associated with the compression volume 23 (i.e., when the shock is in a fully compressed state) and the maximum volume associated with the extension volume 25 of the shock 10 (i.e., when the shock is in a fully extended state). As used herein, the term "extension volume" refers to the volume available for hydraulic fluid in the housing 10, on the same side of the piston as the piston rod. As used herein, the term "compression volume" refers to the volume available for hydraulic fluid in the housing 10, on the opposite side of the piston as the piston rod.

The hydraulic system may be pressurized to maintain a minimum system pressure. Pressuring the system to some minimum level, such as 30 psi, may help prevent cavitation from occurring, particularly when the piston 26 rapidly changes direction. According to some embodiments, the reservoir 16 may include a spring loaded piston or a gas-pressurized bladder to maintain a minimum pressure in the hydraulic system. The reservoir 16 may be positioned at the outlet of the hydraulic pump, where pressures may be lowest in the system, to be most effective. As is to be appreciated, the outlet of the hydraulic motor 14 in the embodiments of FIGS. 2, 4A, and 4B changes between the first port 30 and the second port 32 depending on whether the piston 26 is moving in a compression stroke or an extension stroke. The hydraulic controls 12 of these embodiments are arranged to maintain fluid communication between the hydraulic motor outlet and the reservoir 16 regardless of the direction in which the piston is moving.

According to some embodiments, including those of FIGS. 2, 4A, and 4B, the hydraulic motor 14 may move in phase or in sync with the motion of the piston 26. In such embodiments, freewheeling of the hydraulic motor 14 may be prevented. Embodiments that prevent freewheeling may allow greater control of the force/velocity response of a shock absorber 10 and in this respect, may improve shock performance.

Embodiments that are configured to have the piston 26 move in sync with the hydraulic motor 14 may allow the hydraulic motor 14 to drive the piston 26, when the motor 14 is operated as a pump. According to some embodiments the electric generator 18, which may include a brushless permanent magnet motor, may be operated as an electric motor 18 to drive the hydraulic pump 14. This may allow the electric motor 18 to control the position and/or force at the piston 26, such that the shock absorber may be actively controlled. In such embodiments, valve(s) and the reservoir may operate similarly, even though the piston 26 may be providing an active force as opposed to a force that is merely resistive to movement of the shock 10 that originates from external sources. According to one embodiment, the hydraulic motor 14 may include a positive displacement motor, such as a gerotor, that may operate as a motor and a pump. It is to be appreciated that the term "hydraulic motor" as used herein, refers to an apparatus that converts hydraulic power to mechanical power.

The electric generator and/or the hydraulic motor, when operated as an electric motor and hydraulic pump, may be used to alter the position of the piston within the housing. In this respect the system may be used to control the overall height of a vehicle in which an embodiment of the shock absorber has been installed. This may prove particularly useful for military vehicle transportation, among other applications.

Figure 5:
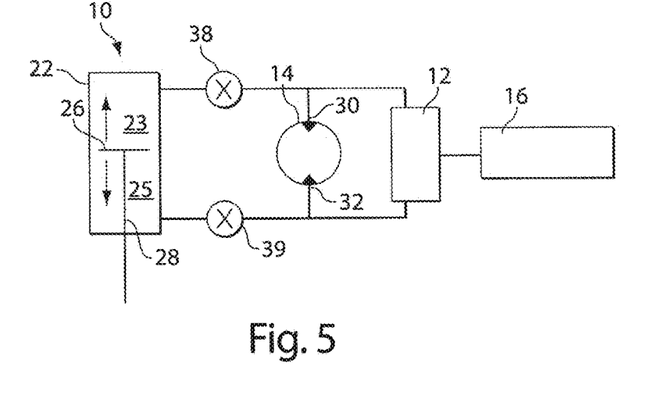
FIG. 5 is a hydraulic schematic diagram of a system that includes locks that may be used to lock the position of a regenerative shock absorber.

According to some embodiments, a lock may be incorporated into the system to hold the piston 26 at a particular position relative to the housing 22. In the embodiment of FIG. 5, the lock includes a pair of valves 38 and 39. A first valve 38 is positioned to close fluid communication to the compression volume 23 and the second valve 39 is positioned to close fluid communication to the extension volume 35, thereby preventing the piston 26 from moving in either a compression or an extension stroke. In other embodiments, only a single valve may be used to prevent the piston from moving in one of a compression or extension directions. Additionally or alternatively, mechanical locks may be used to hold the piston at a given position relative to the housing.

Figure 6:
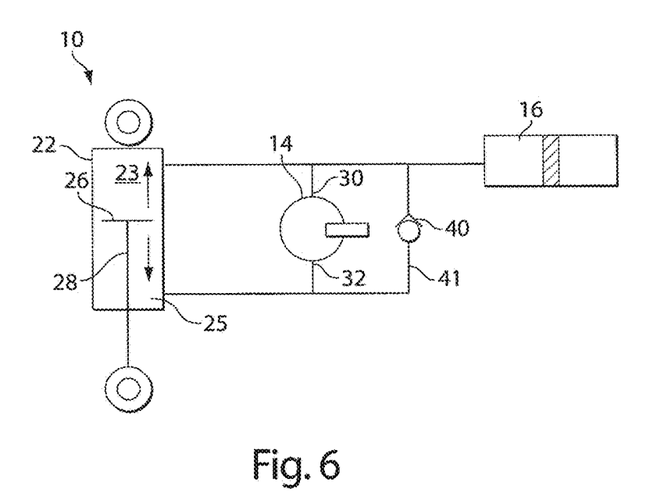
FIG. 6 is a hydraulic schematic diagram of one embodiment that provides damping only during an extension stroke.

According to some embodiments, the shock absorber 10 may provide damping only during one of the compression or extension strokes (i.e., the shock absorber may have "uni-direction damping"). By way of example, FIG. 6 shows one embodiment configured to provide damping only during an extension stroke. In this embodiment, as the piston moves in an extension stroke, a higher fluid pressure in the compression volume 23 opens a check valve 40 and allows hydraulic fluid to bypass the hydraulic motor 14 and to move toward the extension volume 25 through a bypass 41. As with the embodiment of FIG. 2, the volume of hydraulic fluid that is displaced by entry of the piston rod 28 into the system is accounted for by the volume available for hydraulic fluid in the pressurized fluid reservoir 16. When the piston reverses direction and begins an extension stroke, the check valve 40 closes. Pressure builds in the extension volume 25 and fluid then begins to fluid flows through the hydraulic motor 14 to capture energy from movement of the piston 26. Fluid exits the reservoir 16 to compensate for the volume of hydraulic fluid that the piston rod 28 had displaced. It is to be appreciated, that although the illustrated embodiment captures energy from the shock only when the piston is moved in an extension stroke, that other embodiments may be configured to capture energy only during a compression stroke.

According to some embodiments, a bypass (not shown) may be included to bypass the hydraulic motor 14 at particular operating points, such as when hydraulic fluid pressure or piston velocity exceed pre-set threshold values. By way of example, a pressure-relief valve may be included in the system to allow fluid to pass from the inlet side to the outlet side of the motor without flowing through the motor. Such a bypass may protect the hydraulic motor 14 and/or generator 18 from over spinning, which might otherwise occur during a pressure spike. According to some embodiments, a bypass may include a valve connected in parallel with the hydraulic motor 14. For embodiments that include hydraulic motors that operate in both directions, a pair of bypass valves may be installed in parallel to the hydraulic motor such that one of the pair of valves opens in each direction. Bypass valve(s) may be incorporated directly into the piston 26 or connected by fluid circuit that runs parallel to the motor. Although unidirectional and bidirectional configurations are described here, it is to be appreciated that other configurations of bypass valves may also exist.

According to some embodiments, an orifice may be placed in the piston 26 to allow fluid to directly communicate between the extension volume 25 and the compression volume 23. This may be desirable so that there is minimal damping at low velocities and so that the piston may move even if the hydraulic motor is locked in place, as may be the occur at times due to static friction of the hydraulic motor 14 and/or the electric generator 18. Energy loses associated with movement of hydraulic fluid through the orifice during shock operation may be minimized by ensuring the orifice is sufficiently small.

According to some embodiments, the reservoir and accompanying hydraulic valves may be altogether or partially eliminated by allowing the piston rod to exit out both sides of the shock absorber housing 22. By ensuring that the piston rod volume fills both the compression 23 and extension 25 volumes, there is no volumetric change in the system associated with the piston rode entering and exiting the housing. Such systems may not require a reservoir to accommodate changes in volume associated with the piston rode. In this embodiment, a hydraulic motor 14 can be directly connected across the housing with one port in fluid communication with the compression volume 23 and the other port in communication with the extension volume 25, without additional hydraulic controls.

Figure 7A:
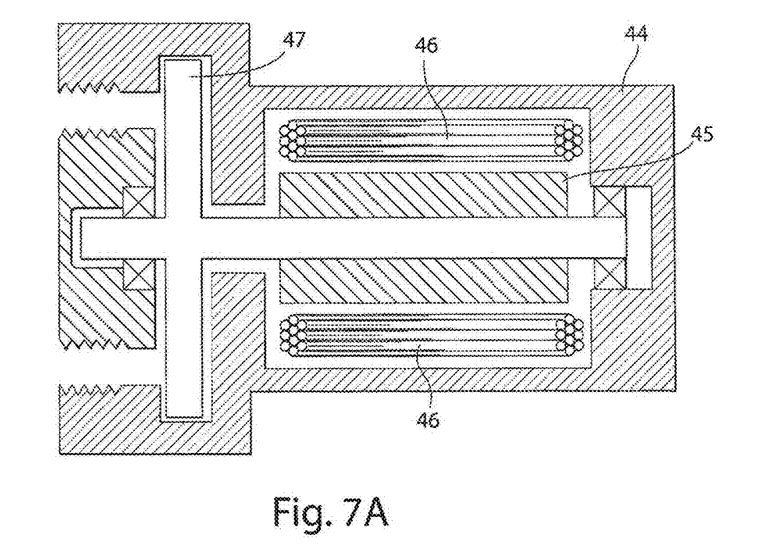
FIGS. 7A-7C are cross-sectional views of hydraulic motors and electric generators that are integrated into a common motor/generator housing and that lack frictional shaft seals.
Figure 7B:
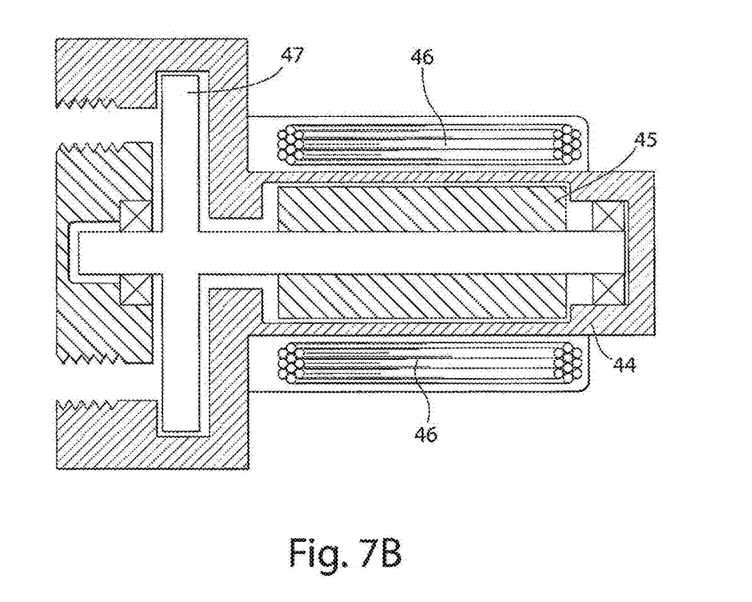
Figure 7C:
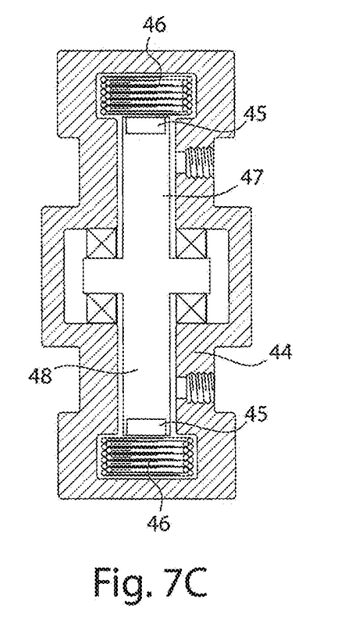
Figure 7D:
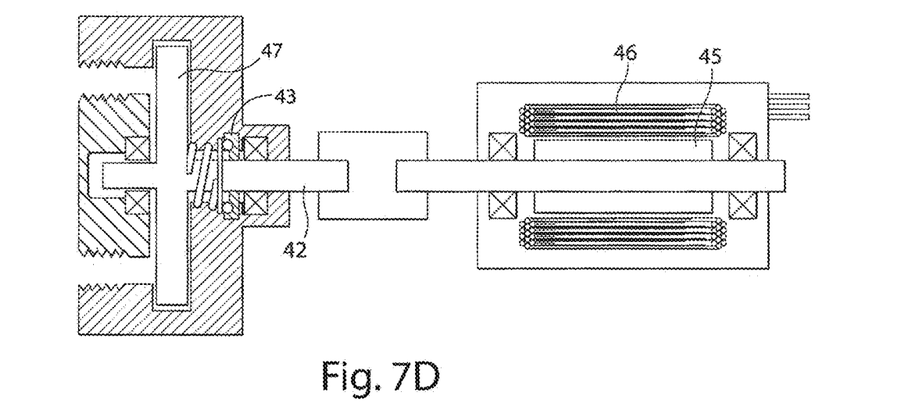
FIG. 7D is a cross-sectional view of a hydraulic motor that includes frictional seals and that is connected, externally, to an electric generator.

The applicants have appreciated that seals 43 found on output shafts 42 of many hydraulic motors, as shown in FIG. 7D, may cause frictional losses. These frictional losses may be substantial when the hydraulic motor is operated in an oscillating manner as the motor in the embodiments of FIGS. 2, 4A, and 4B. As is to be appreciated, output shaft seal friction may be associated with a roughly constant resistive force, regardless of output shaft velocity. The hydraulic motor 14 found in these embodiments may operate at relatively low velocities. Additionally, velocity will reach zero at least at times when the piston and hydraulic motor change directions, according to some embodiments. During low velocities, the constant resistive force associated with shaft seals may be substantially greater when compared to the net torque on the output shaft.

Embodiments of the hydraulic motor and electric generator may be configured to improve power transmission efficiency. As shown in the embodiments of FIGS. 7A-7C, the hydraulic motor 14 and electric generator 18 may be incorporated into a common motor/generator housing 44. In these embodiments, rotational frictional is reduced substantially by eliminating the need for shaft seals that may cause friction. This may additionally allow the rotational element 45 of the electric generator 18 to be immersed in the hydraulic fluid of the hydraulic motor 14. In the embodiments of FIG. 7A coils 46 of the electric generator 18 are also positioned in the hydraulic fluid. In this respect, the additional hydraulic fluid may provide a greater overall thermal mass to the system. Smaller coils may also be used in the electric generator without an associated risk of overheating, which may reduce the inertia of the system and allow for more compact packaging. The greater thermal mass may assist in cooling the electric generator through thermal and mechanical commutation with the overall system. Additionally, placing the rotational elements 45, 47 of the hydraulic motor 14 and the electric generator 18 on a common shaft may reduce the overall rotational mass, which may be beneficial.

Portions of an electric motor 14 in a combined hydraulic motor/electric generator may alternatively be positioned outside of a motor/generator housing 44. In the embodiment of FIG. 7B, coils of the electrical motor are positioned outside of the motor/generator housing 44. In such embodiments, the motor/generator housing 44 may be made of plastic or other materials that allow magnetic flux to pass therethrough to prevent interference with power generation by the electric generator 18. Additionally, placement of coils outside of the housing may eliminate the need to provide an electrical connection through the motor/generator housing.

According to some embodiments, the electric generator 18 or portions thereof may be integrated directly into the hydraulic motor 14 itself. The rotating components 45 of the electric motor in the embodiment of FIG. 7C are positioned at an outer edge of the rotor 48 on a positive displacement motor, according to one embodiment. This may further reduce rotational inertia of the hydraulic motor/electric generator. Additionally or alternatively, the construction shown in FIG. 7C may provide a more compact hydraulic motor/electric generator.

Figure 8:
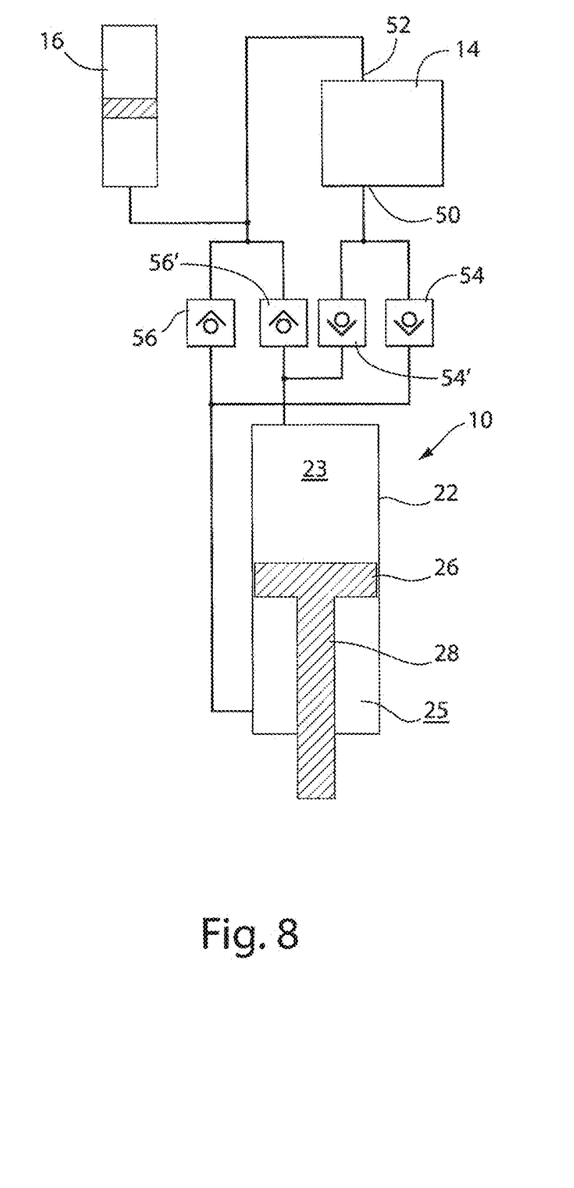
FIG. 8 is a hydraulic schematic diagram of a regenerative shock absorber system, according to another embodiment.

FIG. 8 shows yet another embodiment in which compression 23 and extension volumes 25 of a shock 10 may be placed in fluid communication with a hydraulic motor 14, similar to that described in U.S. patent application Ser. No. 12/104,800, which is incorporated by reference herein in its entirety. In this embodiment, each of the compression volume 23 and the extension volume 25 are in fluid communication with a pair of check valves. One valve 54, 54' of each the pair of check valves is configured to open fluid communication between the hydraulic motor inlet 50 and hydraulic fluid that is pressurized by the shock 10. The other valve 56, 56' of each of the pair of check valves closes fluid communication to motor outlet 52 and the hydraulic fluid that is pressurized by the shock 10. The reservoir 16 in the illustrative embodiment of FIG. 8 remains in fluid communication with the hydraulic motor outlet 52 or, equivalently, the low pressure side of the hydraulic motor 14.

In the embodiment of FIG. 8, check valve 56' closes as the piston begins moving in a compression stroke and check valve 54' opens, providing fluid communication to the hydraulic motor inlet 50 for pressurized hydraulic fluid. As the piston rod 28 enters the shock housing 22, upon compression, the volume displaced by the piston rod 28 is accommodated by hydraulic fluid entering the reservoir 16. As the piston 26 reverses direction and begins the extension stroke, check valve 56 closes and check valve 54 opens, allowing fluid to flow through the hydraulic motor in the same direction as during the compression stroke. In this manner, the bi-directional movement of the piston 26 and shock 16 is converted into uni-directional rotational movement of the hydraulic motor 14.

According to some embodiments, the controller 20 may provide a varying impedance to the electric generator 18 to control the force response of shock 10, based in various parameters such as velocity, while simultaneously capturing energy associated with movement in the shock. The force response may follow a present equation or a lookup table based on such parameters. For example, the force response may be linear based on shock velocity, according to one embodiment. The applicants have appreciated that an output load associated with the electrical system of a vehicle may vary according to electrical demands on the system and/or other factors, such as battery charge state. To capture energy associated with movement of the shock and provide a desired force response, the controller may mix the output load with either a low resistance element to decrease impedance on the electric generator or with a high resistance element to increase impedance on the electric generator. Such mixing may be accomplished, in one embodiment, by pulse-width-modulation (PWM) switching.

Figure 9:
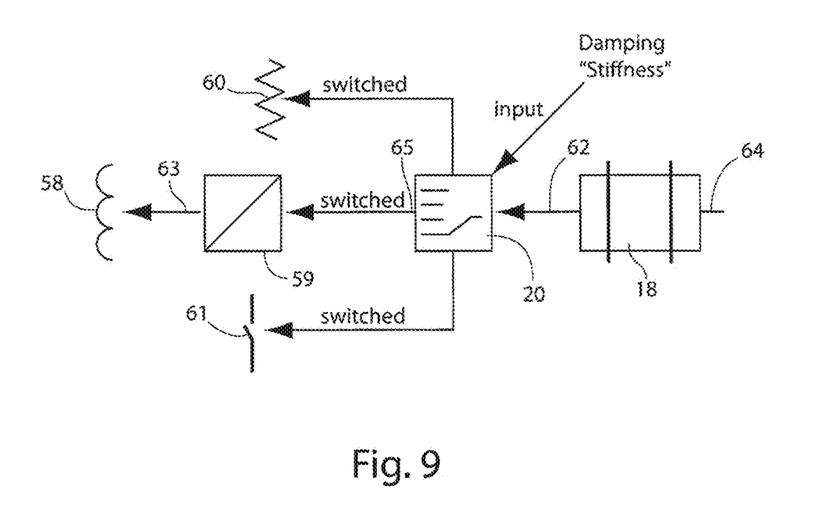
FIG. 9 is a schematic diagram of a controller that may be used to both control an amount of energy that is output to an output load from a regenerative shock absorber system and to control damping of the shock absorber system.

A controller, such as that represented by FIG. 9, may allow the system to achieve various objectives. First, the controller may provide isolation between electric generators 18 associated with different shocks in a vehicle suspension system. This may insure that each shock operates independently of the output load 58, such as that of a vehicle battery. Second, the controller 20 may provide variable damping. The damping may be controlled by the user or automatically via sensors such as a strain gauge sensor that adjusts performance based on vehicle weight or a sensor that directly measures shock position or vehicle height. Such sensors may change the reference resistance that the resistance feedback controller executes. The controller 20 may also enable operation with multiple shock absorbers by matching voltage between multiple shock absorbers by adjusting for the effects of each unit on an electrical bus of a vehicle by feedback control. Additionally or alternatively, the controller may provide battery-safe charging by regulating output voltage and current to safe levels.

FIG. 9 shows, schematically, how the output load 58 being mixed with either a low resistance element or a high resistance element may provide a desired impedance to an electric generator 18. As shown, the output 62 of the electric generator 18 is connected to a feedback controller 20 that switches the output 62 from the electric generator 18 among a low resistance element 60, an output converter 59 such as a voltage-controlled buck/boost converter, and a high resistance element 61, such as an open circuit. The output 63 of the output converter 59 is always connected to an output load 58 of the vehicle, such as the vehicle battery.

Electric energy transfer to the output load 58 may be controlled by different types of output converters 59. One type of voltage controlled output converter 59 that may be used is a buck/boost converter, as shown in FIG. 9. The output converter, through a voltage-feedback circuit, may use a reference voltage to maintain a given output voltage level on the output 63. This allows several regenerative shock absorbers, as may be found on a vehicle, to be wired in parallel. A diode (not shown) in the converter 59 may also insure that power can only flow out from the generator. A filtering capacitor (not shown) on the input 65 of the converter 59 may maintain voltage to the input of the converter even while the time-averaged resistance feedback controller 20 switches the generator 18 between multiple elements 60, 61, 58. The filtering capacitor on the output 63 of the converter may average voltage and current to the output load 58.

To control the rate of damping, or force/velocity response, the impedance at the electric generator output 62 may be switched between the low resistance element 60, the load 58 (preferably through the voltage controlled output converter), and the high resistance element 61. Pulse-width-modulation (PWM) may however be used to switch between combinations of these states to create an averaged damping rate and to allow more selective control over damping. Since output power is only captured when the electric generator 18 is connected to the output load 58, the controller may be biased to maintain this connection over switching between the low resistance element 60 or the high resistance element 61. A microcontroller with appropriate sensors may be used to determine the resistance seen by the generator 18.

The controller 20 may modify the electrical impedance across the generator terminals, thus affecting the damping characteristics of the shock absorber. As discussed herein, resistance across the generator winding may be adjusted by switching the output 62 of the electric generator 18 between the three sources including the low resistance element 60, the converter 59, and the high resistance element 61. The low resistance element 60 (such as a closed-circuit connection (a wire)) creates high damping force. The high resistance element 61, such as an open circuit, provides very low damping. Depending on the load connected to the output of the converter 59, the converter provides differing damping force. The controller preferably uses feedback to achieve a given effective resistance across the generator 18. This feedback may come from sensors such as a voltage and current sensor placed across the terminals of the electric generator. This resistance may be set to a particular value by the manufacturer, the driver (to dynamically adjust the suspension dynamics based on road conditions, driving, or cargo), or by sensors such as strain gauges that adjust damping based on cargo weight.

Adjustment of output voltage 63 is achieved by the converter 59. The converter 59 may include a feedback loop that maintains a substantially constant voltage output 63 when powered. Since input power 64 from the suspension varies, the converter 59 holds the voltage substantially steady while allowing current to fluctuate. The converter circuitry may be similar to that of a buck/boost converter with negative feedback based on output voltage. Capacitors (not shown) smooth the output voltage. It is to be appreciated that any type of efficient converter that is able to output a desired voltage, ensure one-way current flow, and have sufficient input filtering to accommodate a PWM input, may alternatively be used. The buck/boost converter is merely one such example.

Depending on a switching duty cycle, this circuitry has the effect of either reducing the output voltage or increasing output voltage. Duty cycle is controlled via a feedback loop that maintains a given output voltage high enough to be utilized to, for example, charge a vehicle battery or displace vehicle alternator load to increase fuel economy. Neglecting parasitics, the converter 59 operation may be perfectly efficient. Thus for the regenerative shock absorber disclosed herein connected to a conventional 12 volt car battery, the converter may convert 6.2 v at 1 A from the generator into 12.4 v at 0.5 A. Likewise it will convert 49.6 v at 1 A into 12.4 v at 4 A. Voltage stays relatively constant, regardless of the input, as compared to the amount by which current typically varies. There may be some increase in voltage when higher power is provided to an electrical system of a vehicle (subject to voltage limits of the electrical system). Energy is conserved and energy from the generator, minus heat losses, may be harvested for use.

The low resistance element 60 may dissipate energy from the shock absorber 10 as heat if, for example, no additional energy may safely go to the output load 58, such as when the battery of a vehicle is fully charged and no energy consuming devices are in use. In this respect, damping may be provided to the shock absorber 10 even when the output load 58 may not receive electric power from the regenerative shock absorber 10.

The generator may be connected to the high resistance element 61, such that the electric generator winding is disconnected from the load 58. In this mode, the generator output is effectively an open-circuit and very little back-EMF is produced. No energy is captured for use in this mode and close to zero damping is provided from the electrical system.

The rotational direction and/or velocity of the electric generator may be determined by a controller 20 by measuring the voltage 62 at terminals of the generator 18. This information may be used by the controller 20 to determine a proper amount of resistance to place on the electric generator terminals. Additionally, the terminal resistance may relate the voltage on the terminals to the current flowing therethrough. The current flowing through the terminals may be proportional to the torque on the electric generator 18 and hydraulic motor 14 shaft and hence to the pressure of the hydraulic fluid. This pressure acts on the piston face to produce a force on the piston rod 28. It is possible for the load controller to assign specific performance characteristics to the force response of the shock. For example, in order to control shock absorber performance, the hydraulic cylinder may follow a specific force/velocity curve which can be programmed via the controller 20.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A vehicle suspension system comprising:
    a first shock absorber system including:
        a housing containing a compression volume and an extension volume;
        a piston slidably received in the housing, wherein the piston separates the compression volume from the extension volume;
        a pressurized reservoir configured to receive fluid from at least one volume selected from the group consisting of the extension volume and the compression volume;
        a first valve configured to control flow between the reservoir and the compression volume;
        a second valve configured to control flow between the reservoir and the extension volume;
        a first hydraulic machine that includes a first port and a second port, wherein the first hydraulic machine is configured to rotate in a first rotational direction and in a second rotational direction, and wherein the second rotational direction is opposite the first rotational direction;
        a first bypass fluid flow path that transfers fluid, in at least one operating condition, between the compression volume and the extension volume without passing through the first port and the second port;
        a first fluid flow path that fluidly connects the compression volume to the first port;
        a second fluid flow path that fluidly connects the extension volume to the second port;
        a first electric machine operatively coupled to the first hydraulic machine, and
        a controller configured to at least partially control a force applied to the piston by controlling the electric machine at least at one operating point.

2. The vehicle suspension system of claim 1, wherein the first hydraulic machine is configured to operate as a hydraulic motor in a first mode of operation and as a hydraulic pump in a second mode of operation, wherein the first electric machine is configured to operate as an electric generator in the first mode of operation and as an electric motor in the second mode of operation.

3. The vehicle suspension system of claim 2, wherein the first hydraulic machine is selected from the group consisting of a hydraulic pump and a hydraulic motor, and wherein the first electric machine is selected from the group consisting of an electric generator and an electric motor.

4. The vehicle suspension system of claim 3, wherein the first bypass flow path includes the first valve and the second valve.

5. The vehicle suspension system of claim 4, wherein the first valve is not fluidly disposed along the first fluid flow path, wherein the first valve is not fluidly disposed along the second fluid flow path, wherein the second valve is not fluidly disposed along the first fluid flow path, and wherein the second valve is not fluidly disposed along the second fluid flow path.

6. The vehicle suspension system of claim 4, wherein the first valve is a check valve that is configured to allow flow from the reservoir to the extension chamber through the first bypass flow path and prevent flow from the extension chamber to the reservoir through the first bypass flow path.

7. The vehicle suspension system of claim 4, wherein the force is an active force in at least the first mode of operation.

8. The vehicle suspension system of claim 7, wherein the force is a resistive force in at least the second mode of operation.

9. The vehicle suspension system of claim 4, further comprising a controller configured to control a response of the vehicle suspension system based on a driving condition.

10. The vehicle suspension system of claim 4, further comprising a controller configured to alter a force/velocity response of the first shock absorber system.

11. The vehicle suspension system of claim 4, wherein the shock absorber system includes a piston rod attached to the piston, wherein the piston rod extends from a side of the piston that partially defines the extension volume.

12. The vehicle suspension system of claim 11, wherein in the second mode of operation the piston is driven by the hydraulic machine to provide an active force.

13. The vehicle suspension system of claim 12, wherein, in at least one mode of operation:
    movement of the piston in a first direction urges rotation of the hydraulic machine in the first rotational direction, and
    movement of the piston in a second direction urges rotation of the hydraulic machine in the second rotational direction.

14. A vehicle comprising the vehicle suspension system of claim 13.

15. The vehicle suspension system of claim 13, further comprising:
    a second shock absorber system that includes:
        a second hydraulic machine distinct from the first hydraulic machine of the first shock absorber system; and
        a second electric machine, distinct from the first electric machine of the first shock absorber system, wherein the second electric machine is operatively coupled to the second hydraulic machine of the second shock absorber system.

16. A vehicle suspension system comprising:
    a first shock absorber system including:
        a housing containing a compression volume and an extension volume;
        a piston slidably received in the housing, wherein the piston separates the compression volume from the extension volume;
        a pressurized reservoir configured to receive fluid from at least one volume selected from the group consisting of the extension volume and the compression volume;
        a bidirectional hydraulic machine that includes a first port and a second port;
        a first bypass fluid flow path and a first valve fluidly disposed along the first bypass fluid flow path, wherein the first bypass fluid flow path transfers fluid, in at least one operating condition, between the compression volume and the extension volume without passing through the first port and the second port;
a first fluid flow path that fluidly connects the extension volume and the compression volume, wherein the first fluid flow path includes the first port and the second port;
an electric machine operatively coupled to the bidirectional hydraulic machine; and
a controller configured to at least partially control a force applied to the piston by controlling the electric machine at least at one operating point.

17. The vehicle suspension system of claim 16, wherein the bidirectional hydraulic machine is configured to operate as a hydraulic motor in a first mode of operation and as a hydraulic pump in a second mode of operation, and wherein the first electric machine is configured to operate as an electric generator in the first mode of operation and as an electric motor in the second mode of operation.

18. The vehicle suspension system of claim 17, wherein the bidirectional hydraulic machine is selected from the group consisting of a hydraulic pump and a hydraulic motor, and wherein the electric machine is selected from the group consisting of an electric generator and an electric motor.

19. The vehicle suspension system of claim 18, further comprising:
a second bypass fluid flow path and a second valve fluidly disposed along the second bypass fluid flow path, wherein the second bypass fluid flow path fluidly connects the extension volume and the compression volume without passing through the first port and the second port.

20. The vehicle suspension system of claim 18, wherein the first bypass fluid flow path is incorporated in the piston.

21. The vehicle suspension system of claim 19, wherein the first valve allows flow in only a first direction, and wherein the second valve allows flow in only a second direction opposite the first direction.

22. The vehicle suspension system of claim 21, further comprising a controller configured to control a response of the vehicle suspension system based on a driving condition.

23. The vehicle suspension system of claim 19, wherein in the second mode of operation the piston is driven by the hydraulic machine to provide an active force.

24. A vehicle comprising the vehicle suspension system of claim 23.

25. The vehicle suspension system of claim 23, wherein the electric machine includes one or more rotational components; and
wherein at least one of the one or more rotational components is at least partially immersed in hydraulic fluid.

26. A vehicle suspension system comprising:
a first shock absorber system including:
a housing containing a compression volume and an extension volume;
a piston slidably received in the housing, wherein the piston separates the compression volume from the extension volume;
a pressurized reservoir configured to receive fluid from the extension volume;
a bidirectional hydraulic machine that includes a first port and a second port;
one or more valves, wherein each valve of the one or more valves is configured to control flow between the reservoir and the extension volume;
a first fluid flow path between the compression volume and the extension volume that includes the first port and the second port;
an electric machine operatively coupled to the bidirectional hydraulic machine, wherein the electric machine is configured to operate as an electric generator in a first mode of operation and as an electric motor in a second mode of operation;
a controller configured to at least partially control a response of the vehicle suspension system based on a driving condition by controlling the electric machine at least at one operating point.

27. An active shock absorber comprising:
a bidirectional hydraulic machine that includes a first port and a second port;
an electric machine operatively coupled to the first bidirectional hydraulic machine;
a housing containing a compression volume and an extension volume;
a piston slidably received in the housing, wherein the piston separates the compression volume from the extension volume;
a pressurized reservoir configured to receive fluid from at least one volume selected from the group consisting of the extension volume and the compression volume;
a first valve configured to control flow between the reservoir and the compression volume;
a second valve configured to control flow between the reservoir and the extension volume;
a first bypass fluid flow path that transfers fluid, in at least one operating condition, between the compression volume and the extension volume without passing through the first port and the second port;
a first fluid flow path that fluidly connects the compression volume to the first port; and
a second fluid flow path that fluidly connects the extension volume to the second port;
wherein the active shock absorber is configured to apply a resistive force in a first mode and an active force in a second mode by controlling the electric machine at least at one operating point.

28. The active shock absorber of claim 27 wherein the bidirectional hydraulic machine is selected from the group consisting of a hydraulic pump and a hydraulic motor, and wherein the electric machine is selected from the group consisting of an electric generator and an electric motor.

29. The active shock absorber of claim 28, wherein, in at least one mode of operation:
movement of the piston in compression urges rotation of the bidirectional hydraulic machine in a first rotational direction, and
movement of the piston in extension urges rotation of the bidirectional hydraulic machine in a second rotational direction, wherein the second rotational direction is opposite the first rotational direction.

30. A vehicle suspension system comprising the shock absorber of claim 29.

* * * * *